UNITED STATES PATENT OFFICE.

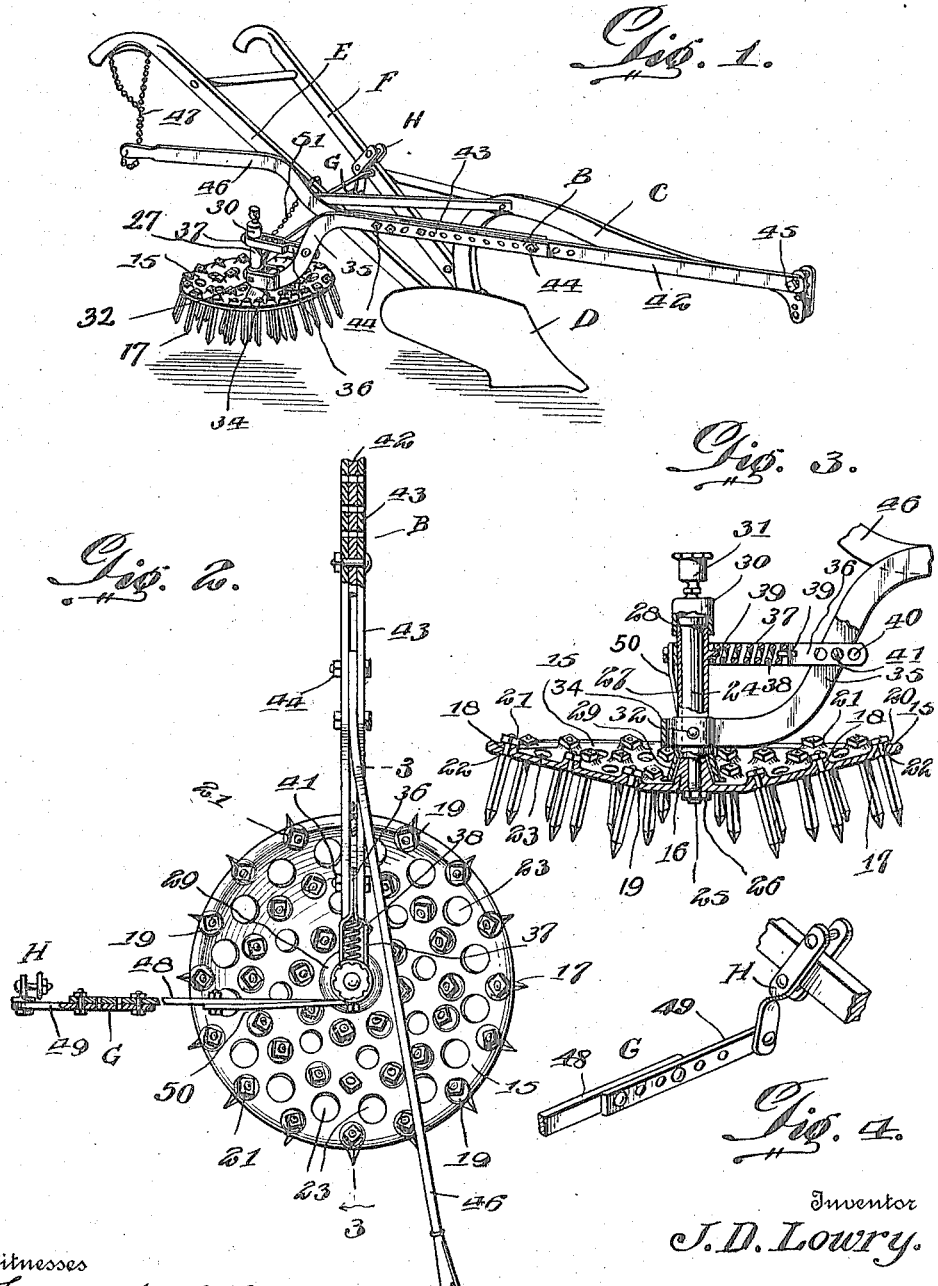

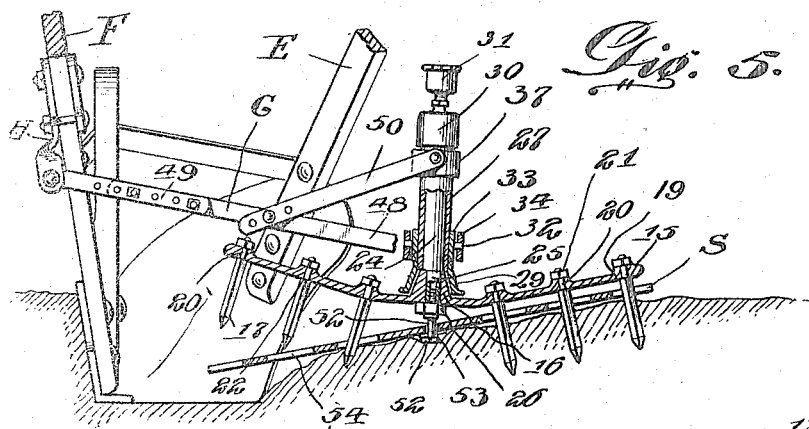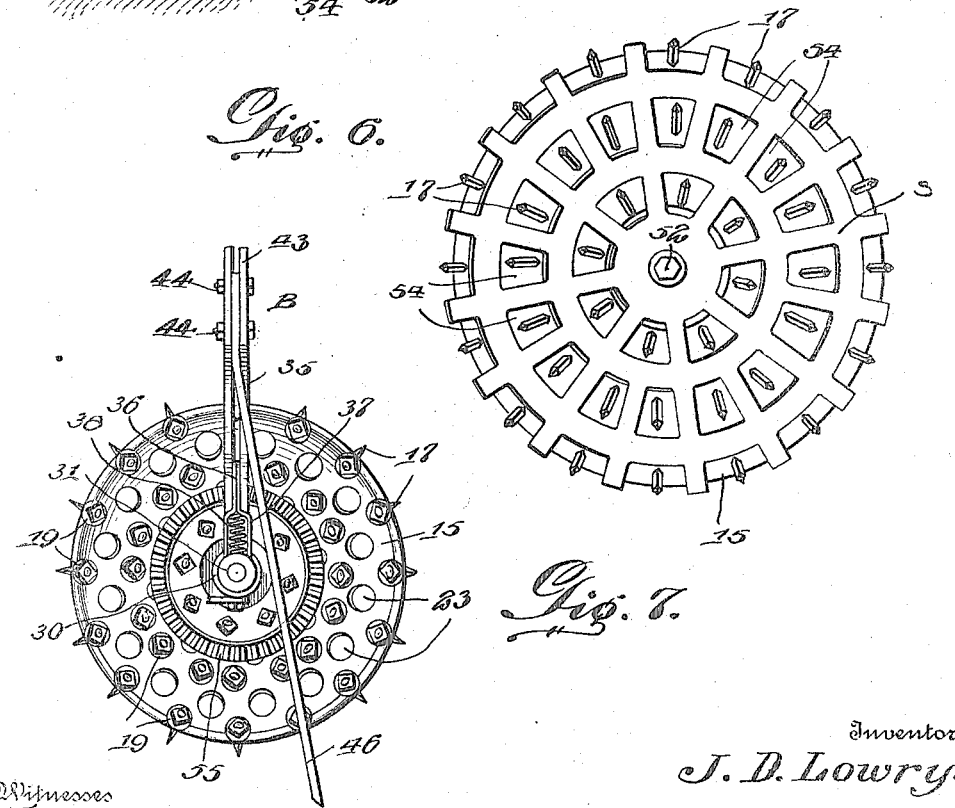

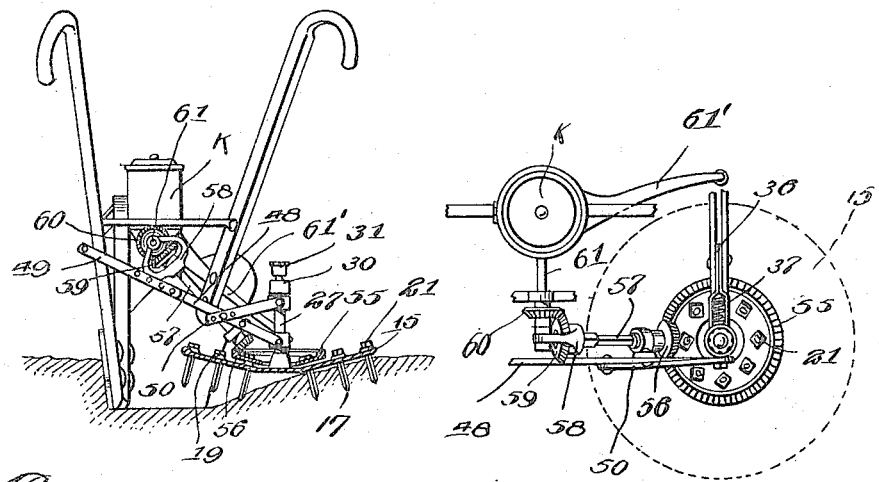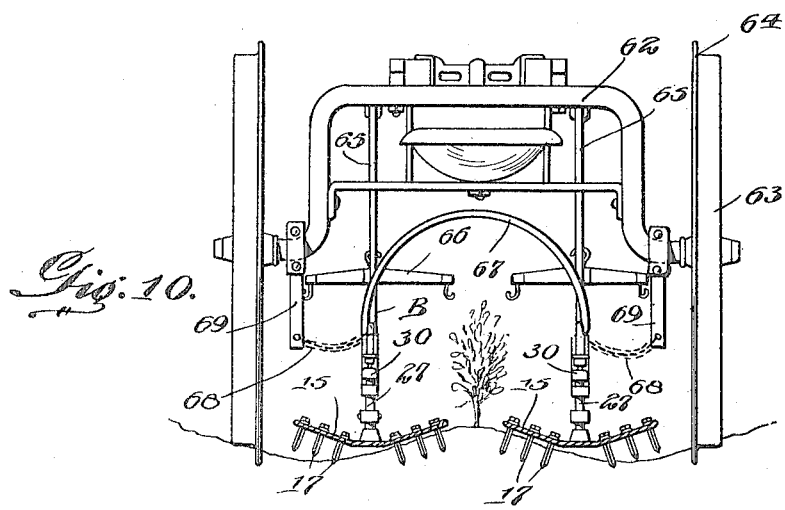

JOHN D. LOWRY, OF WILMINGTON, NORTH CAROLINA.

ROTARY HARROW.

1,207,579.

Specification of Letters Patent.

Patented Dec. 5, 1916.

Application filed April 3, 1916. Serial No. 88,545.

*To all whom it may concern:*

Be it known that I, JOHN D. LOWRY, a citizen of the United States, residing at Wilmington, in the county of New Hanover and State of North Carolina, have invented new and useful Improvements in Rotary Harrows, of which the following is a specification.

This invention relates to rotary harrows, and it has for its object to produce a simple and improved device of this class which may be easily and successfully operated independently or in connection with plows and cultivators of various types and with various other agricultural machines for the purpose of breaking, agitating, pulverizing and leveling and otherwise treating the soil to leave it in the best condition to absorb moisture and to promote the growth of crops.

A particular object of the invention is to so improve the construction of the rotary harrow unit that it will be positively and constantly rotated by engagement of some of its teeth with the soil when in active operation.

A further object of the invention is to combine with the harrow unit a shedding device whereby dirt, roots, weeds and the like that become entangled with the teeth will be automatically stripped therefrom and shed on the ground.

A further object of the invention is to so construct the harrow unit that dirt accidentally falling thereon will be agitated and sifted through openings in the crown or body thereof.

A further object of the invention is to produce an improved construction whereby the harrow unit may be successfully and advantageously utilized in combination with a seed planter, a fertilizer distributer or a similar implement.

With these and other ends in view which will readily appear as the nature of the invention is better understood, the same consists in the improved construction and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a perspective view showing the application of my improved rotary harrow to an ordinary walking plow. Fig. 2 is a top plan view showing the harrow unit detached from the plow, a portion of the beam having been removed. Fig. 3 is a vertical sectional view taken on the line 3—3 in Fig. 2. Fig. 4 is a perspective detail view of one of the brace members. Fig. 5 is a vertical transverse sectional view showing the harrow unit applied to a walking plow and showing also the shedder assembled therewith. Fig. 6 is a bottom plan view of the rotary harrow unit having the shedder assembled therewith. Fig. 7 is a top plan view of the rotary harrow unit having a gear wheel applied thereto for the transmission of motion. Fig. 8 is a rear view of a walking plow to which the rotary harrow unit has been applied as well as a seed or fertilizer hopper, the operating mechanism of which receives motion from the harrow unit. Fig. 9 is a top plan view of the harrow unit, the seed or fertilizer hopper and the transmission mechanism. Fig. 10 is a view in rear elevation of a cultivator frame structure to which two of the rotary harrow units have been applied.

Corresponding parts in the several figures are denoted by like characters of reference.

The improved device in its most simple form includes a crown or body member 15, the same consisting of a disk which is dished downwardly from the circumference in the direction of the center thereof. Said disk has a centrally disposed upwardly extending apertured boss or hub 16, and it has a plurality of circumferential rows of teeth 17 for the reception of which apertures 18, each surrounded by a boss 19, are provided. As best seen in Fig. 3 of the drawings, each tooth is provided with a shank 20 extending through an aperture 18 and provided with a nut 21 which is tightened against a boss 19, the reduced portion or shank 20 being productive of a shoulder or offset 22 that abuts on the under face of the disk, this construction resulting in great simplicity, strength and ease of assemblage.

It will be particularly observed that the teeth 17, owing to the dished formation of the disk or crown 15, will be angularly disposed with respect to the axis of the disk. This, for reasons which will presently appear, is an extremely important feature of the present invention. The disk or crown 15, is, furthermore, provided intermediate the bosses through which the shanks of the teeth extend with numerous apertures 23 which may be of varying size, these constituting sifting apertures for any soil or dirt which during operation may fall on top of the harrow unit. The projections consisting of the bosses 19 and the nuts 21 will perform a secondary function in assisting to break up any lumps of dirt that may fall on the harrow unit, pulverizing and disintegrating the same so that the fine dirt will readily sift through the apertures 23.

A spindle or axle 24 is provided at its lower end with a reduced extension 25 that projects through the hub 16 and is provided at its lower extremity which is threaded, as shown, with a nut 26 that is tightened against the underside of the disk 15. Means may be provided for locking the nut securely to prevent separation of the parts. The spindle 24 has a bearing in a sleeve or box 27, and it has been shown, see Fig. 3, as being provided at its upper end with a flange 28 abutting on the upper edge of the sleeve. The sleeve 27 is provided at its lower extremity with a dust cap 29 engaging the boss or hub 16. Mounted on the upper end of the sleeve is a cap 30 with which a lubricating receptacle 31 is connected.

The bearing sleeve is provided on diametrically opposite sides thereof with pivot members or trunnions 32 which, as seen in Fig. 5, may be formed on a collar 33 surrounding said bearing sleeve. By the trunnions 32 the bearing sleeve is supported for rocking movement in an oblong loop 34 at the lower end of an offset or standard 35 formed on a beam B with which the harrow unit is thus operatively connected. A brace member 36 which is bolted upon or otherwise connected with the standard 35 extends rearwardly with respect to said standard and is provided with an oblong loop 37 surrounding the bearing sleeve between which and the forward wall of the loop a spring 38 is interposed, said spring being retained in position by pins or nipples 39. The brace member 36 has been shown as being provided with a plurality of apertures 40 for the passage of the bolt or connecting member 41, this enabling tilting adjustment of the bearing sleeve to be made for the purpose of meeting varying conditions.

The beam B is composed of front and rear members 42, 43 that are adjustably connected together by means of bolts or fastening members 44, thereby enabling the length of the beam to be varied according to the conditions under which the device is used. In Fig. 1 the beam has been shown as being connected pivotally with the forward end of a plow beam C by means of a bolt or pivot member 45. The plow beam C is associated with an ordinary turning plow D which is in every respect of conventional construction, being equipped with handles E and F. Connected with the beam B by some of the bolts or fastening members 44 is a handle member 46, the latter being connected with one of the plow handles by a flexible element, such as a chain 47 which may be adjusted so as to limit the movement of the harrow unit and which also constitutes a lifting element which may be grasped by the operator for the purpose of lifting the harrow unit from the ground. By making the beam B adjustable as to the length thereof, as described, the harrow unit may be readily applied to plows of various kinds and patterns as well as to various other agricultural machines. It will be seen that when the point of pivotal connection formed by the bolt or pivot member 45 is unusually high or low, the tendency will be to tilt the bearing sleeve 27 rearwardly or forwardly, but such tendency may be corrected by adjustment of the brace member 36 with respect to the standard or offset 35.

Connected with the rear portion of the loop 34 is one end of a brace member G which is composed of two adjustably connected members 48, 49; the other end of said brace member G being connected, as best seen in Fig. 4, with a clip or clamp H that is clamped on the plow handle F. An inclined brace 50 connects the brace member G with the rearward end portion of the loop 37.

By the beam B and the brace member G the improved rotary harrow unit may be very conveniently and securely connected, as seen in Fig. 1, with an ordinary walking plow, and the same elements may be utilized for connecting the harrow unit with or mounting it upon various agricultural machines, it being obvious that within the scope of the invention the particular shape and dimensions of the beam and the brace member may be modified and that auxiliary braces may be used wherever their presence may be found desirable.

A flexible element, such as a chain 51, may be utilized to connect the loop 37 of the brace member 36 with the plow handle E for the purpose of limiting the distance to which the teeth of the harrow unit may enter the ground.

The reduced portion 25 at the lower end of the spindle 24 is tapped for the reception of a headed screw 52 which may be firmly secured by means of a lock nut which serves to support the shedder S. This consists of a metallic disk which is loosely mounted on the screw or supporting element 52 by an aperture 53 which is of larger diameter than the member 52 so that the shedder will be supported for freely rocking movement. The shedder is provided with apertures 54 for the passage of the harrow teeth 17, said apertures being of such shape and dimensions that the free movement of the shedder will not be interfered with. It will be readily understood, and particularly by reference to Fig. 5 of the drawings, that when a portion of the shedder is in contact or nearly in contact with one side of the crown or disk 15, the portion of the shedder at the diametrically opposite side of the disk 15 will be spaced therefrom so that the harrow teeth 17 on that side will be entirely or partially withdrawn from engagement with the shedder. As the harrow unit rotates it is evident that the teeth will be successively subjected to the stripping action of the shedder, the function of which is to remove from the harrow teeth clods of dirt and accumulations of roots, weeds and other trash which may have gathered thereon.

When the device, as shown in Figs. 1 and 5, is operatively assembled with a plow, or when it is operatively assembled with any other agricultural machine in connection with which it may be used, it is evident that by proper adjustment, the harrow unit may be sustained with the axis of the spindle about which it rotates in a vertical or upright position, or in a tilted position, according to whether the harrow unit is to engage an incline or whether it is to operate on level ground. When the harrow is to engage an incline, such as will be formed by the furrow slice turned by a plow, the axis of the spindle should be in a vertical or upright position, as clearly seen in Fig. 5, such slice or incline being engaged by the teeth at one side of the harrow disk, while the teeth at the diametrically opposite side of said disk will be supported above the furrow and substantially out of contact or engagement with the ground. Then, when the implement with which the device is connected is drawn forward it will be readily seen that the harrow disk is compelled to rotate about its axis by the positive engagement with the ground of the teeth at one side thereof, while the teeth at the diametrically opposite side are practically unobstructed. The result will be that the dirt engaged by the harrow teeth will become thoroughly broken, agitated and pulverized, the rotation of the harrow unit being perfectly steady and uniform. When the device is equipped with the shedder, as seen in Fig. 5, it is evident that said shedder will partake of a constant rocking motion with respect to the harrow disk with which it rotates, by which rocking motion the teeth that are not in direct engagement with the ground will be stripped from any matter adhering thereto.

In Figs. 8 and 9 of the drawings the improved device has been shown applied to a walking plow on the frame structure of which there is also mounted a hopper K which may be of any type or variety for the distribution of seed or fertilizing material or any substance that it may be desired to scatter on the land and to incorporate with the soil. When the device is thus employed there is formed or mounted on the surface of the disk or crown 15 a bevel gear 55 which is in mesh with a pinion 56 at one end of a telescopic shaft 57 which is supported in a convenient bearing 58 that is pivoted on or otherwise connected with the hopper K, said telescopic shaft carrying at its other end a bevel gear 59 meshing with a bevel gear 60 on the operating shaft 61 of the hopper, whereby the discharge mechanism is actuated. The telescoping shaft and related parts constitute a simple transmission means whereby motion may be transmitted from the rotary harrow unit to the discharging mechanism of the hopper, and it will be understood that other convenient and well known transmission means may be substituted when desired. When the improved device is used in this connection, it will be seen that the seeding device or fertilizer dropping device, as the case may be, is actuated by the harrow unit without resorting to other special means for driving the same. The hopper has been shown, see Fig. 9, as being equipped with a discharge spout 61' whereby the material discharged from the hopper may be deposited on the ground in advance of the harrow unit, as shown, or said spout may, if preferred, be directed so as to discharge material on top of the harrow unit where it will be received in the dished apertured surface, passing through the apertures to the ground while the latter is being stirred and agitated by the harrow teeth, thereby causing the seed or fertilizer material to become thoroughly incorporated with the soil.

In the various uses of the device, as herein shown and described, it will be seen that if obstructions, such as rocks or stumps should be encountered, the harrow unit will be free to rock about the axis of the trunnions 32, against the tension of the spring 38 which will yield to any sudden compression between the bearing sleeve 27 and the forward wall of the loop 37 in which said spring is housed. Damage from any sudden collision with obstructions of various kinds will thus be avoided, and to overcome the obstructions the operator by grasping the flexible element 47 may raise the handle 46, thus lifting the harrow unit out of the way until the obstruction has been passed.

Heretofore the device has been described as consisting mainly of a single unit, but I will have it clearly understood that a plurality of units may be assembled with a single carrying frame whenever circumstances shall render such assemblage desirable. Thus, in Fig. 10, there have been shown two of the rotary harrow units assembled with a single carrying frame of the type of an ordinary cultivator frame of which 62 designates the arched axle and 63 the wheels which are equipped with flanges 64 that will serve to prevent skidding or lateral movement of the carrying frame as well as of the implements carried thereby. The carrying frame might be constructed with steering knuckles in place of the ordinary wheel carrying spindles, but as such construction is very well known in the art it is not deemed necessary to particularly illustrate the same. The rotary harrow units are connected by the beams B with the vertical draft bars 65 of the carrying frame, said draft bars having draft elements such as swingletrees 66 connected therewith in the customary manner. The rotary harrow units have also been shown as being connected by means of an arch 67 straddling the row of plants, and flexible elements such as chains 68 are used to connect each harrow unit with a bracket 69 depending from one of the wheel carrying spindles for the purpose of limiting any possible lateral swaying or movement.

From the foregoing description taken in connection with the drawings hereto annexed, it will be seen that I have produced a very simple and effective rotary harrow device which is capable of a great variety of uses, either independently or in connection with agricultural implements of various descriptions.

Having thus described the invention, what is claimed as new, is:—

1. A rotary harrow consisting of a dished disk having circumferentially disposed rows of teeth connected therewith, said disk being provided with sifting apertures between the teeth.

2. A rotary harrow consisting of a dished disk having circumferentially disposed rows of teeth connected therewith, said disk being provided with sifting apertures between the teeth, and said teeth being angularly disposed with respect to the axis of the disk.

3. A rotary harrow unit consisting of a dished disk having circumferentially disposed rows of upwardly extending apertured boses, and teeth having shanks fixed in said bosses.

4. A rotary harrow unit consisting of a dished disk having circumferentially disposed rows of upwardly extending apertured bosses, and teeth having shanks fixed in said bosses, said disk being provided with sifting apertures intermediate the bosses with which the teeth are connected.

5. A rotary harrow unit consisting of a dished disk having circumferential rows of angularly disposed teeth, said disk being provided with an axially disposed hub with which a spindle is connected.

6. A rotary harrow unit consisting of a dished disk having circumferential rows of angularly disposed teeth, said disk being provided with an axially disposed hub with which a spindle is connected, in combination with a bearing sleeve for said spindle, and supporting means for said sleeve.

7. A rotary harrow unit consisting of a dished disk having circumferential rows of angularly disposed teeth, said disk being provided with an axially disposed hub with which a spindle is connected, in combination with supporting means with which said bearing sleeve is connected for tilting movement.

8. A rotary harrow unit consisting of a dished disk having circumferential rows of angularly disposed teeth, said disk being provided with an axially disposed hub with which a spindle is connected, in combination with supporting means including an elongated loop, and trunnions on which the bearing sleeve is supported for tiltable movement.

9. A rotary harrow unit comprising a dished disk having circumferential rows of angularly disposed teeth and an axial hub, a spindle engaging the hub, a bearing sleeve on said spindle, and a beam having an elongated loop with which the bearing sleeve is connected for tiltable movement.

10. A rotary harrow unit comprising a dished disk having circumferential rows of angularly disposed teeth and an axial hub, a spindle engaging the hub, a bearing sleeve on said spindle, and a beam having an elongated loop with which the bearing sleeve is connected for tiltable movement, in combination with a spring to resist the tiltable movement of the bearing sleeve.

11. A rotary harrow unit comprising a dished disk having circumferential rows of angularly disposed teeth and an axial hub, a spindle engaging the hub, a bearing sleeve on said spindle, and a beam having an elongated loop with which the bearing sleeve is connected for tiltable movement, in combination with a spring to resist the tiltable movement of the bearing sleeve, and a brace member having an elongated loop in which the spring is housed.

12. A rotary harrow unit comprising a dished disk having circumferential rows of angularly disposed teeth, and means for supporting said disk for rotary movement, in combination with a shedder loosely supported for wabbling movement adjacent to the under face of the harrow disk, said shedder consistsing of a flat plate having apertures for the passage of the harrow teeth.

13. A rotary harrow unit comprising a dished disk having circumferential rows of angularly disposed teeth, in combination with a shedder mounted adjacent to the under face of the harrow disk, said shedder consisting of an apertured plate through which some of the harrow teeth, located at one side of the harrow unit, may project while other teeth located at the diametrically opposite side of the harrow unit will be substantially clear of said shedder plate.

In testimony whereof I affix my signature.

JOHN D. LOWRY.

Copies of this patent may be obtained for five cents each, by addressing the "Commissioner of Patents, Washington, D. C."